United States Patent [19]

Debroche et al.

[11] Patent Number: 5,395,476
[45] Date of Patent: Mar. 7, 1995

[54] MACHINE FOR THE MANUFACTURE OF A CROWN REINFORCEMENT FOR TIRES

[75] Inventors: Claude Debroche, Cebazat; Daniel Laurent, Meylan, both of France

[73] Assignee: Sedepro, Paris, France

[21] Appl. No.: 101,937

[22] Filed: Aug. 4, 1993

[30] Foreign Application Priority Data

Aug. 7, 1992 [FR] France .................... 92 09926

[51] Int. Cl.6 ............................................. B29D 30/08
[52] U.S. Cl. .................... 156/397; 156/117; 156/425
[58] Field of Search ............ 156/117, 397, 425, 429, 156/121, 169, 177, 172, 175

[56] References Cited

U.S. PATENT DOCUMENTS

| | | | |
|---|---|---|---|
| 3,082,140 | 3/1963 | Vanzo | 156/397 X |
| 3,143,306 | 8/1964 | Dijkmans et al. | 156/425 |
| 3,379,591 | 4/1968 | Bradley | 156/173 |
| 3,616,001 | 10/1971 | Addis . | |
| 3,674,584 | 7/1972 | Klein . | |
| 3,748,203 | 7/1973 | Greene . | |
| 4,541,887 | 9/1985 | Carter . | |
| 4,600,456 | 7/1986 | Oswald . | |
| 4,801,344 | 1/1989 | Laurent et al. | 156/117 |
| 4,804,436 | 2/1989 | Debroche et al. . | |
| 4,952,259 | 8/1990 | Debroche et al. . | |

FOREIGN PATENT DOCUMENTS

469011 10/1950 Canada .................. 156/397
1535966 1/1968 France .

*Primary Examiner*—Geoffrey L. Knable
*Attorney, Agent, or Firm*—Brumbaugh, Graves, Donohue & Raymond

[57] ABSTRACT

The laying of pieces 40 of cord 4 is assured by a laying tube 30 which receives the cord by placing its inlet facing the outlet of a cord distributor, the knife 85 of which cuts the cord just upstream of the laying tube 30. At the end of the laying tube 30 there is disposed a laying head 32 which is displaced transversely along the support 1 on which the reinforcement is built. The angle of laying of the cord is adjusted by judiciously coordinating the transverse speed of displacement of the head 32 and the speed of rotation of the support 1.

14 Claims, 9 Drawing Sheets

MACHINE FOR THE MANUFACTURE OF A CROWN REINFORCEMENT FOR TIRES

BACKGROUND OF THE INVENTION

The present invention relates to the manufacture of tires. More precisely, it relates to the manufacture of tread-bracing reinforcements which are found in belted and most frequently in radial-ply tires.

From U.S. Pat. No. 4,952,259, the art learned of an advance in the manufacture of such reinforcements, no longer in the form of semi-finished products known as "plies" which were prepared flat and then incorporated upon the assembling of the tire, but, rather, directly on the tire during the course of manufacture, and this from a single reel of cord. This proposal, which is based on the projecting of a cord in the manner of a whip lash, makes it possible to sweep the usual angles of so-called breaker plies and it makes it possible to produce radial casing reinforcements. However, it is difficult to obtain small angles with it, and in particular, it is difficult with it to project pieces of cord of long length and therefore to produce very wide tires.

SUMMARY OF THE INVENTION

The object of the present invention is to propose a method of manufacture which makes it possible to produce from a single reel of cord all the crown reinforcements, that is to say, the reinforcements which are found beneath the tread, whatever the angle which the cord of these reinforcements forms with respect to the median plane perpendicular to the axis of rotation of the tire.

Another object of the invention is to propose a method of manufacture which makes it possible to control with great precision the exact angle formed by the cord, whatever the axial position in question on the crown of the tire, that is to say, both at the edges and at the center of the crown reinforcement.

In particular, the object of the invention is to be able to lay the cord helically, that is to say, along an angle which is strictly constant if one likens the crown of the tire to a cylinder. Another object of the invention is to be able to lay the cord along a variable angle which is, for instance, greater on the edges than at the center of the crown reinforcement, the angle being measured, as customary, with respect to the equatorial plane of the tire (the plane perpendicular to the axis of rotation).

The invention relates to a method of manufacturing a tire built progressively on a support, mounted rotatably around an axis, by laying the different components of the tire in the order and at the place required by the architecture of said tire, in which method at least one crown reinforcement is formed from a cord fed to at least one laying tube upstream of which the cord is cut so as to obtain pieces thereof, the cord passing through said tube to reach a laying head which is displaced transversely just above the support, the pieces of cord and the support having self-adhering properties.

The expression "manufacture of a tire" means complete manufacture or else a partial manufacture consisting, for instance, of manufacturing a crown block at least the reinforcements of which are manufactured by the method which will be described.

The term "cord" is used in a very broad sense to include a monofilament, a multifilament, a cable or twist or equivalent assemblage, and this whatever the material of which the cord is made or the treatment to which it has been subjected, for instance, a surface treatment in order to favor its self-adherence on the support or its intimate bonding with the rubber.

When one refers more specifically to a piece of cord there is more precisely meant the piece of cord which extends from one edge of the crown reinforcement to the other. There is involved a method for manufacturing the reinforcements from a single cord, and therefore one designed to make continuous use of the cord supplied, for instance, from a reel, and which produces a reinforcement (a ply, to use the customary terminology) containing pieces of cord and not a continuous cord which would, for instance, be helically wound.

The support in question may be a removable rigid metal core having the shape of the surface of the internal cavity of the tire. However, it could also be a reinforced inflatable membrane, such as found in tire-building drums. It could also be a rotatable body on which a crown block is manufactured. In order for the cord which has been laid to adhere on the support it is sufficient, for instance, that it be coated with a layer of rubber. When a metal core is used as support, it is preferable then to vulcanize the tire on it in order to facilitate the removal of the core from the tire.

By effecting a transverse displacement just above the support, the laying head passes axially from one side of the support to the other, moving above it at a small height, so as to accompany the cord during the entire laying thereof on the support. This movement makes it possible to bring it to the proper place for the starting of the laying and to guide it over the support in order to obtain the desired trace for the cord in the future crown reinforcement.

According to a variant of the method, the rotation of the support itself constitutes a parameter of adjustment of the cord laying angle. It may be noted that in this variant the laying head is displaced transversely along a trajectory which is substantially parallel to the axis of rotation of the support. The laying angle is adjusted by a rotation of the support which is coordinated with the transverse movement of the laying head. This movement, which defines the base cycle, is repeated until the entire reinforcement is in place on the support. Of course, between the laying of two adjacent cords, the support is shifted with respect to the trajectory of the laying head by an amount corresponding to the desired laying pitch.

The invention also extends to a machine for the manufacture of a crown reinforcement for tires comprising a cord distributor, means for laying the cord at the desired place on the support, and means for driving the support in rotation around its axis of symmetry of revolution, characterized by the fact that the outlet of the cord distributor delivers the cord to the laying members at a point fixed in space which is located radially above the support, and by the fact that the laying members comprise essentially at least one laying tube arranged downstream of the cord distributor, the cord delivered being threaded into the inlet of the laying tube while the latter substantially faces the said outlet of the cord distributor at a slight distance from it, the cord traveling within the laying tube up to a laying head which is rigidly connected to the laying tube, and means permitting the transverse displacement of the laying head just above the support.

In the event that the machine is used to carry out the method of the invention, the cord is driven upstream of the laying device into which it is threaded and is cut upstream of the inlet to the laying tube so as to remove pieces from it. The upstream cutting makes it possible to drive the cord at constant speed, which assures great precision and perfect uniformity. The cutting could be effected downstream of the laying tube provided that the thread can be delivered by fits and starts (nominal speed, zero speed, nominal speed, etc.). The initial advance of the thread in the laying tube and the cutting of the thread should preferably be regulated in such a manner that the edges of each piece are deposited at the desired place on the support. The length of the laying tube is preferably adjusted as a function of the length of the piece to be laid.

The machine of the present invention also makes it possible to produce a reinforcement consisting of a single continuous cord (subject to the fact that a metal wire cannot be bent 180°); it is sufficient for this not to actuate the cutting of the cord for the production of pieces and not to actuate the driving of the cord, so as to avoid any conflict between the drive of the cord and the pulling of it by the rotation of the support. In this case, the cord can be laid continuously by spirally winding.

An application of the invention is described below in which pieces of cord rather than a continuous cord are laid. The cord laid is a metal cable of any type currently used to form crown reinforcements. The cord is preferably covered with rubber to assure perfect adherence to the support which, in turn, presents a surface coated with raw rubber to the cord.

The cutting of the cord is preferably installed just at the place where the cord is threaded into the inlet of a laying tube. The cord distributor then comprises a cord drive assembly which makes it possible to impose a selected advance on the cord, delivering the cord to a cord-cutting device for the production of pieces.

In order to displace the laying head transversely, use is made, for instance, of a flexible drive strand mounted on a guide circuit, a part of which is disposed transversely with respect to the support over the entire width of the latter, the laying head being hooked to the drive strand. The machine comprises means which assure the movement of the drive strand. The flexible strand is, for instance, a chain (as in the drawings of the invention), or a belt or cable driven without slippage.

It has been indicated that a part of the guide circuit is disposed transversely. This means that the part thereof which effectively assures the guiding of the head while it lays the cord is developed in a direction having an axial component with respect to the support.

The laying head is advantageously displaced transversely along a path contained substantially in a meridian plane (that is to say, a plane which includes the axis of rotation of the support). In this way, the guiding of the head during the laying takes place over a short distance and, in particular, the distance along which it is necessary to guide it is independent of the angle of laying, which is adjusted in the manner explained below.

In this case, the laying angle of the pieces of cord is adjusted by coordinating the speed of the means for the displacement of the said laying head and the drive speed of rotation of the support. Fundamentally, the laying angle of the cord then depends only on the combination of the following two speeds: axial component of the transverse speed of the chain and tangential speed at the surface of the support due to the rotation of the latter.

If one guides along a trajectory forming an angle which is much smaller than 90°, for instance the angle of laying of the cord on the support, the guide trajectory must be curved more extensively in order to remain substantially at all times at the same distance from the support.

All the details for the reduction to practice of the invention are explained below, with the assistance of the accompanying drawings.

DESCRIPTION OF PREFERRED EMBODIMENTS

Figure 1:
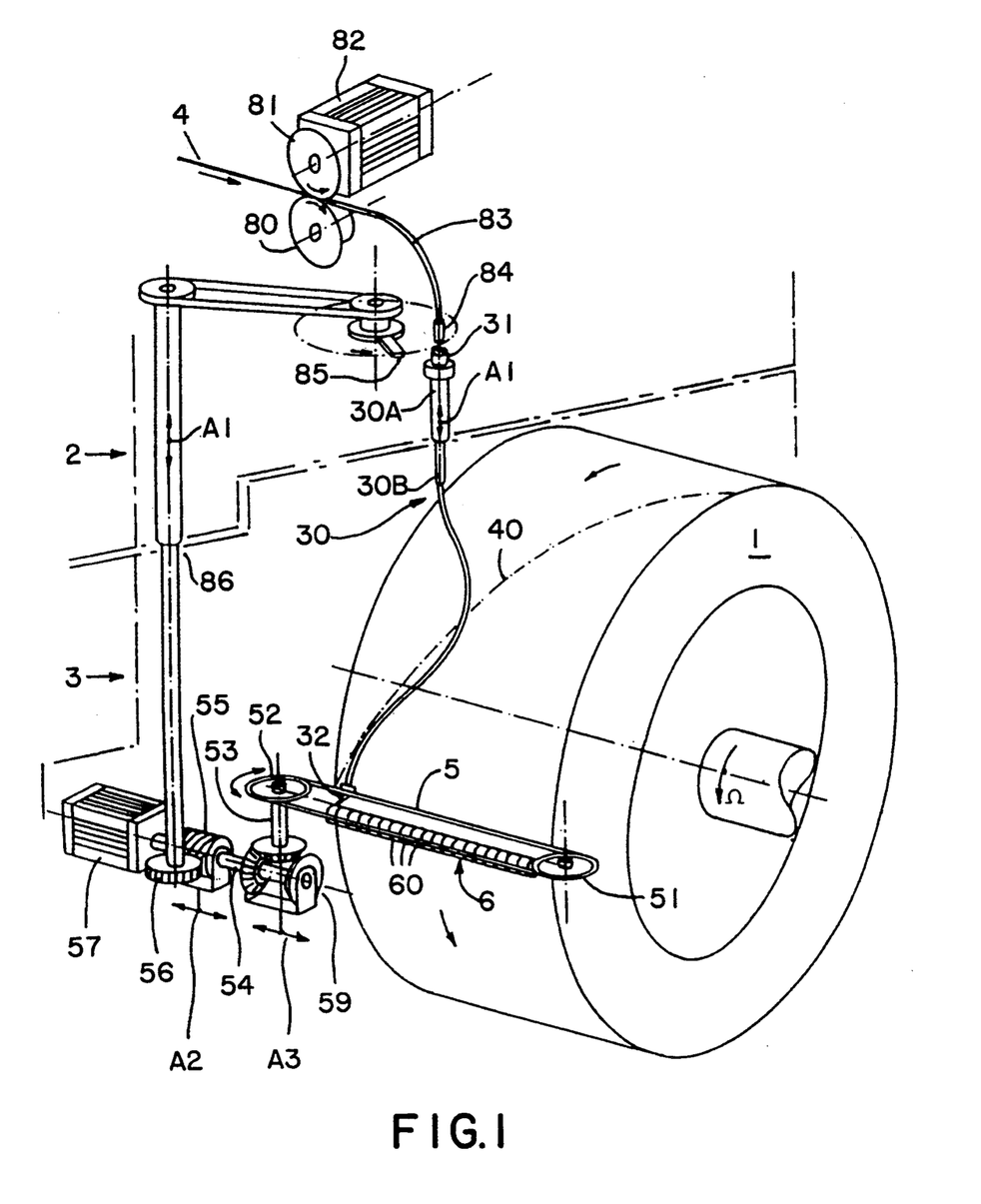
FIG. 1 is a general perspective view showing the essential parts of a first machine in accordance with the invention.

Referring to FIG. 1, there can be noted a rigid core 1 forming the support on which the crown reinforcement is manufactured. This support could also be formed of any type of form defining the surface on which the pieces of cord constituting the reinforcement are to be disposed, such as, for instance, an inflatable reinforced membrane, or else a form which is adjustable in diameter of the type used in crown block building machines producing a purely cylindrical profile or a transversely curved profile. The core 1 has already been covered with all the components which it is to receive before the implanting of the crown reinforcement. The core 1 is driven in rotation in the direction indicated by the arrow W.

The cord distributor comprises a core drive assembly and a cord cutting device. The cord 4 is unwound from a reel (not shown) and is driven by two rollers 80, 81 between which the cord is clamped. The roller 81 is driven by the motor 82. The rollers 80, 81 are covered with an anti-skid covering, such as vulcanized rubber. Due to this system of drive, it is possible to impose a very precise feed on the cord 4 so that one can know at all times the precise measurement of the quantity of cord 4 called up based on a knowledge of the rpm of the motor 82 and on the gear reduction installed. Any type of cord 4 can be driven and measured in this way.

At the outlet of the rollers 80, 81, the cord 4 is introduced into a flexible tube 83 the reinforced end of which constitutes a barrel 84 which supports the cord 4 when it is cut by the rotary knife 85. At the moment when the rotary knife 85 cuts the cord 4, the latter is held stationary for a very brief instant. It is therefore advisable that the flexible tube 83 can stretch sufficiently in order momentarily to contain the amount of cord 4 which continues to be propelled by the rollers 80, 81.

The cord-laying members are arranged downstream of the cord distributor assembly. The barrel 84 constitutes the outlet of the cord distributor. The laying members comprise essentially a laying tube 30, the inlet 31 of which is located adjacent the discharge of the barrel 84. The inlet 31 of the laying tube is disposed directly above the core 1, substantially in the median plane of said core 1. The outlet of the laying tube is connected directly to a laying head 32 which is displaced transversely along the core 1. The laying tube 30 must be formed of a flexible material since it connects a point fixed in space, the inlet 31, with a point movable in space, the laying head 32.

The laying head 32 is carried by a chain 5 mounted on two pulleys 51, 52 arranged on opposite sides of the core 1. This represents the guide circuit for the laying head. The pulleys 51 and 52 are a distance apart which is slightly greater than the width of the widest crown reinforcement which is to be produced. The axis of rotation of the pulleys 51 and 52 is perpendicular to the radius of the core passing through the drive chain 5 and is also perpendicular to the axis of rotation of the core 1.

Such an arrangement is obviously especially adapted for driving the laying head at all times in the same direction. The laying head moves along the support, from left to right, in order to lay pieces inclined in a "right" helix, and then returns to its starting point without reversal of the tangential speed. However, one could easily construct a machine in which the laying head has a reciprocating movement—transverse displacement for the laying and then return, without laying, by reverse movement over the same path. The chain and pulley system can also be used in this way.

The pulley 52 is keyed on a shaft 53 which, in its turn, is driven in rotation by the shaft 54 via bevel gears 59. The shaft 54 is driven in rotation by the motor 57. A worm 55 is slidably mounted on the shaft 54. A toothed wheel 56 engages with the endless worm 55 and transmits the movement to a telescopic shaft 86. The telescopic shaft 86 transmits the movement to the rotary knife 85 via a belt.

The machine preferably comprises a pressing device intended to assure the adhering of the cords 4 laid on the core 1. At the very least, it is important that the adherence of the cord to the support be sufficient so that, as soon as the cord is cut, the rotation of the support drives the piece along with it without risk of slippage which would be harmful for the precision of the laying. This pressing device is formed in this case of a ramp 6 of pressing rollers 60 extending across the entire width of the core 1 and arranged parallel to the drive chain 5 just at the point where the cord 4 comes onto the core 1. In this way, the pressing device is mounted parallel to the guide circuit of the laying head.

It is important to note that the cutting stops the cord 4 for a very brief instant. After the cutting, the piece of cord no longer is fed from the upstream drive. For this reason, the sequence of the operations is adjusted in such a manner that the end of the cord 4 reaches the core 1 just before the cord 4 is cut. After the cutting, the feed of the cord 4 is caused by the movement of the core 1 to which it adheres.

It should also be noted that if the speed of the cord 4 is greater than the peripheral speed of the core 1, it is desirable for the cut to take place just after the cord 4 is clamped between the rollers 60 and core 1, the slight additional length momentarily accumulating between the inlet 31 and the barrel 84. On the other hand, if the speed of the cord 4 is less than the peripheral speed of the core 1, the cord 4 should be cut just before it is clamped between rollers 60 and core 1. The ramp 6 is therefore positioned in such a manner that the first roller 60 clamps the cord 4 when it is brought in front of it by the laying head 32.

All the parts which have just been described are arranged in two assemblies: a feed assembly 2 and a laying assembly 3. The laying assembly 3 comprises the laying head 32 and its drive and guide mechanism. This laying assembly 3, by radial sliding, can move away from or towards the axis of rotation of the core 1 in order to adjust the radius of laying of the cords 4. The feed assembly comprises essentially the cord feed and the cord cutting parts. The laying tube 30 connects the feed assembly 2 to the laying assembly 3. For purposes of adjustment which will be explained below, the laying tube 30 has two sections 30A and 30B fitted one within the other. The section 30A forms part of the feed assembly 2, while the section 30B forms part of the laying assembly 3.

The principal adjustments of the machine are indicated diagrammatically by the arrows A1, A2 and A3. The adjustment A1 is a sliding movement of the feed assembly 2 with respect to the laying assembly 3. The purpose of this movement is to vary the useful length of the laying tube 30 in order to adapt it to the length of the piece 40 of cord 4 which is to be laid. The rotary knife 85 removes a piece 40 of cord 4 just at the moment that the end of the cord 4 reaches the core 1. The laying tube 30 must therefore be capable of storing the entire length of the piece 40 which is to be laid. In order to vary the useful length of the laying tube 30, the section 30A is fitted within the section 30B and the depth of penetration can be adjusted by the adjustment A1. These two sections 30A and 30B can turn with respect to each other in order to permit the laying head 32 to turn completely on itself as it is forced to do by the movement of the drive chain 5.

The adjustment A2 makes it possible to position the edge of the crown reinforcement on the core 1. A first manual adjustment causes the cord 4 to arrive up to the head 32 of the laying tube 30 in order to adjust the desired position of the edge of the crown reinforcement. If small variations around this position are required, it is necessary to set a shift in phase between the action of the rotary knife 85 and the movement of the drive chain 5. This shift is obtained by causing the worm 55 to slide along the axis 54. The adjustment A2 is indispensable in order to change, for instance, from the first breaker ply (to again use the customary terminology) to the second, since, in general, they do not have the same width and the edges are not precisely superposed radially.

The adjustment A3 consists in shifting the pinion of the bevel gears 59 in order to reverse the direction of direction of the chain 5 without changing the direction of rotation of the knife 85, since the shape of the latter makes it necessary to use it always in the same direction (see below). The adjustments A1, A2 and A3 can very easily be made automatic.

Figure 2:
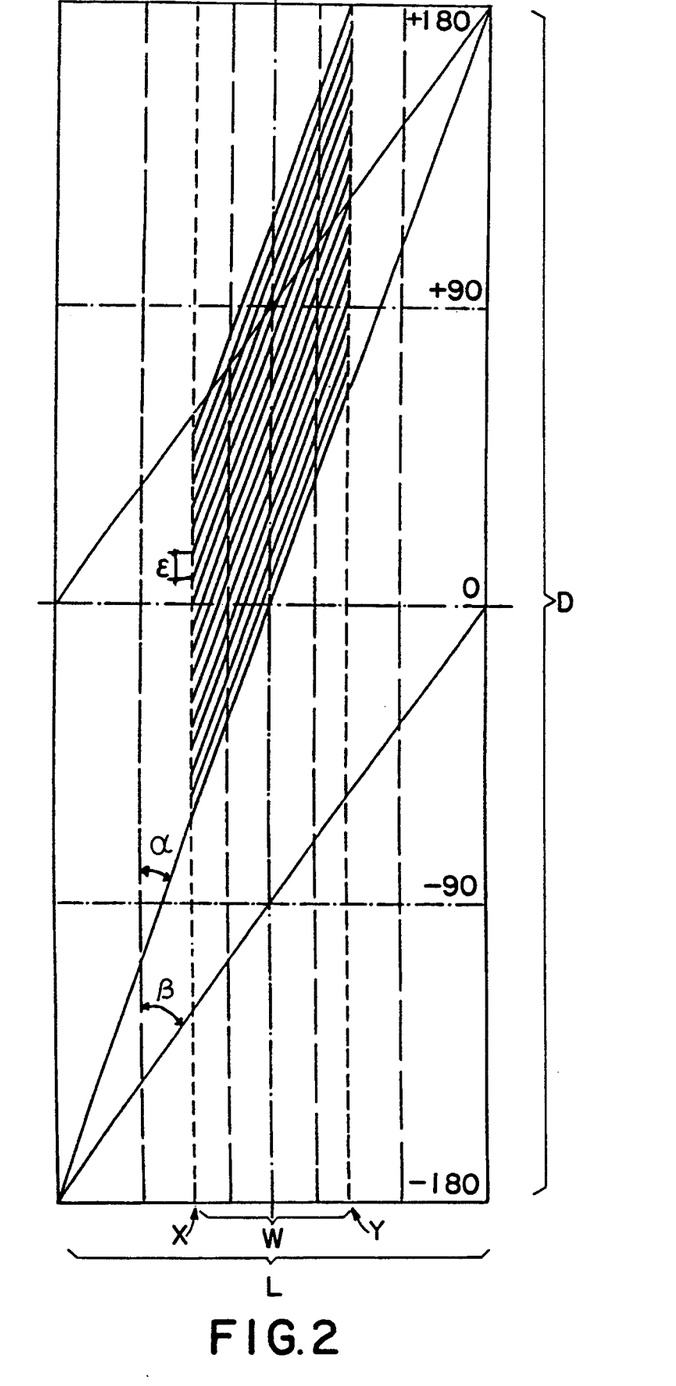
FIG. 2 is a diagrammatic view which shows the method of laying the pieces of cord in accordance with the invention.

In FIG. 2 there is shown a developed view in a plane of the surface along which the reinforcement cords are laid. In order to simplify the reasoning, let us assume that this surface on which the reinforcement is built is a cylinder. The width W of the reinforcement appears on the abscissa axis in the diagrams and the development D appears on the ordinate. The angles entered on the ordinate axis facilitate an understanding of the principle of the laying of the reinforcement cords.

The chain 5 which assures the movement of the laying head is shown in developed view on the abscissa in the diagram by the segment L. The length L of the chain 5 is proportional to the tangent of the laying angle $\alpha$. It will also be noted that the length of the segment L is greater than twice the width W of the crown reinforcements. This makes it possible precisely to guide the head 32 along the entire width of the crown reinforcement by arranging the pulleys 51 and 52 slightly beyond this guide zone.

When the head 32 makes a complete revolution in front of the core 1, this corresponds, in the developed view, to a passage from left to right along the segment L. The point X of the path L of the laying head 32 corresponds to one edge of the crown reinforcement. The point Y on the path L corresponds to the other edge of the crown reinforcement. Only a part of the developed diagram represents the crown reinforcement: this is the surface contained between the horizontal lines corresponding to $-180°$ and $+180°$ and the vertical lines extending from the points X and Y. It may be recalled that, in order for the edge of the piece 40 of cord laid to correspond at all times to the edge of the crown reinforcement, it is necessary that the movements of the chain 5 and of the rotary knife 85 be synchronized, as explained above.

If there is precisely one revolution of the core 1 while the chain 5 also makes a complete revolution, then the helix angle obtained is equal to $\alpha$ (see FIG. 2). A complete reinforcement comprises a large number of adjacent pieces 40 separated by the laying pitch $\epsilon$. In order to produce the reinforcement continuously, the movements are controlled in such a manner that for a complete revolution of the chain 5 the core 1 is turned 360° plus a fraction of 360° corresponding to the laying pitch $\epsilon$. Strictly speaking, this slightly changes the helix angle $\alpha$, since this angle is represented by a diagonal drawn in the rectangle the width of which corresponds to the development of the chain 5 and the length to the relative circumferential movement between the core 1 and the head 32 of the laying tube 30. The angle corresponding to the laying pitch being very small, it is assumed in the following reasoning that the change in the helix angle which results therefrom is negligible as compared with $\alpha$. In order to produce a crown reinforcement, the movements of rotation of the core 1 and of the chain 5 are set in a ratio of 1:1 if it is desired to effect a laying with angle $\alpha$, and as many revolutions are carried out as there are pieces 40 in a crown reinforcement.

Let us now examine the possibilities of adjusting the laying angle of a cord 4 which are afforded by the machine described. In order to be able to work at a high rate, it is preferable that all the drive motors turn at constant speed, particularly the drive motor for the core 1. In such case, the trajectory of the laying head 32 of the laying tube 30 is always represented by an inclined line in a diagram such as that of FIG. 2. A variation of the nominal speed of the chain 5 has two consequences: first of all, the change of the helix angle, which is a desired consequence, and also the change of the frequency of laying of the pieces of cords on the core 1; for example, if one doubles the speed of the chain 5, two pieces 40 are laid for one revolution of the core 1 (plus a fraction of a revolution to be adapted as a function of the final laying pitch desired).

If the speed of the chain is multiplied by a non-integer then, in addition to the two consequences set forth above, it is found that each of the pieces can no longer always be laid at the same desired axial position. The edges of the pieces being no longer aligned circumferentially, one arrives at an impasse. It is therefore necessary to impose a condition that one could call the "ply edge" condition which leads to permitting only multiples or submultiples of the chain speed corresponding to the angle $\alpha$ traced in FIG. 2.

Finally, the laying pitch is a parameter which it is also necessary to control since it is conditioned by the architecture of the tire to be manufactured. The laying pitch leads to modifying slightly the speed of the core, which has no effect on the position of the edges of pieces 40. The speed of the core is thus selected by taking into account the desired helix angle, the laying frequency and finally the laying pitch.

With such a machine, it is necessary that the laying angle $\alpha 0$ satisfy the following condition: $\tan \alpha = k(L/D)$, in which $k = \ldots, \frac{1}{3}, \frac{1}{2}, 1, 2, 3, 4, \ldots$ By way of example, if one doubles the speed of the chain 5, leaving the speed of rotation of the core 1 unchanged, one obtains the angle $\beta$ (see FIG. 2).

In another variant, the machine comprises several laying tubes, all arriving at a laying head and all having an inlet through which the cord is threaded. The machine comprises a device which makes it possible to present each of its inlets successively to the cutting device for introduction of the cord. The movement of the presentation device is synchronized with the movement of the drive strand.

Let us assume that the machine has five tubes 30 (see FIG. 3) spaced equidistantly on the chain 5, the inlet of each tube 30 being fastened to an orifice 35 of a turret 50 constituting the presentation device. The turret 50 is mounted so as to present each of its orifices 35 in succession to the drive and cord-cutting assembly for introduction of the cord into one of its orifices. The movement of the turret 50 is synchronized with the movement of the drive chain 5.

Figure 3:
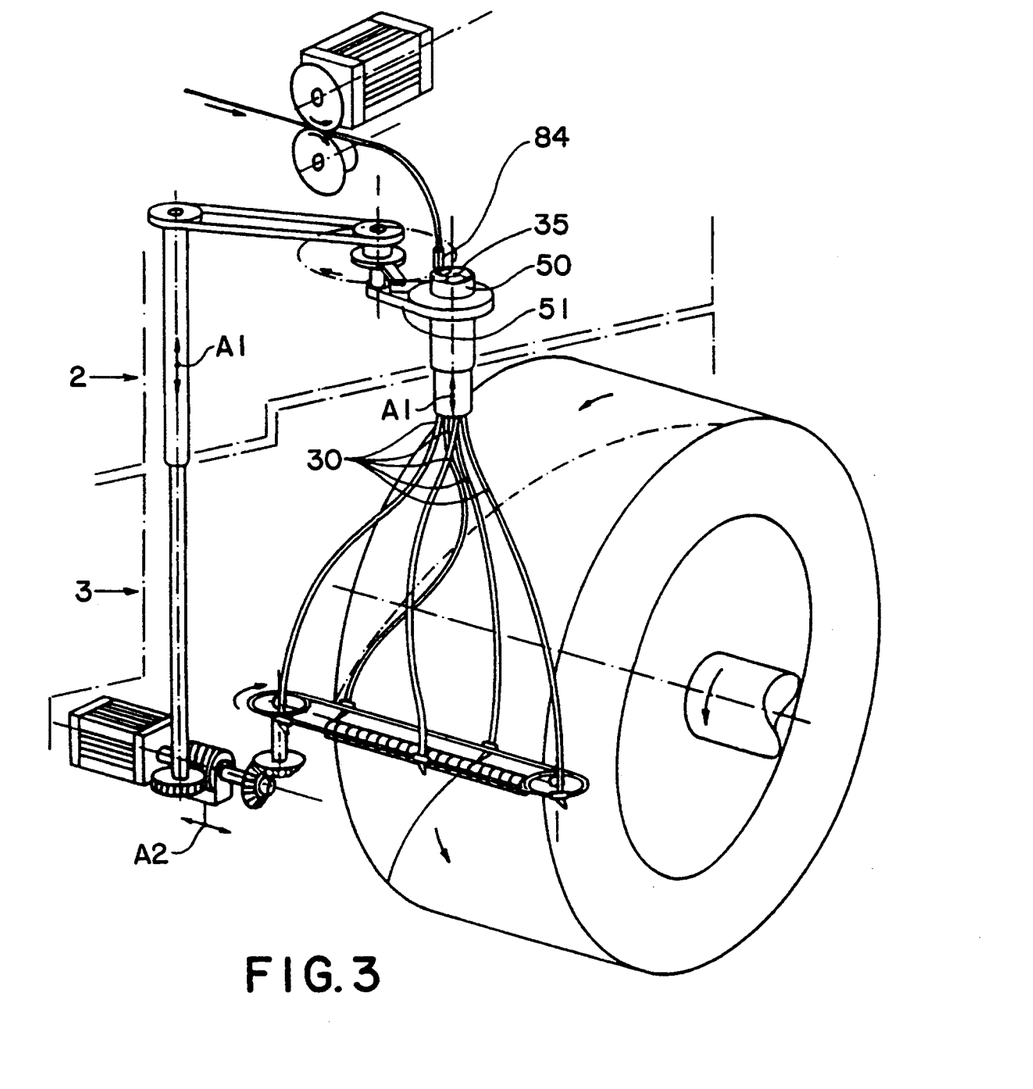
FIG. 3 shows a variant of the first machine.

By respecting a speed ratio of 1:1 for the speeds of the core and the drive chain 5, we once again obtain the same laying angle $\alpha$ as for the previous variant. Due to the five laying heads, the manufacture of a crown reinforcement commences at five places separated circumferentially on the core by an angle of 72°. The complete reinforcement is completely manufactured five times faster than with the preceding variant.

Figure 4:
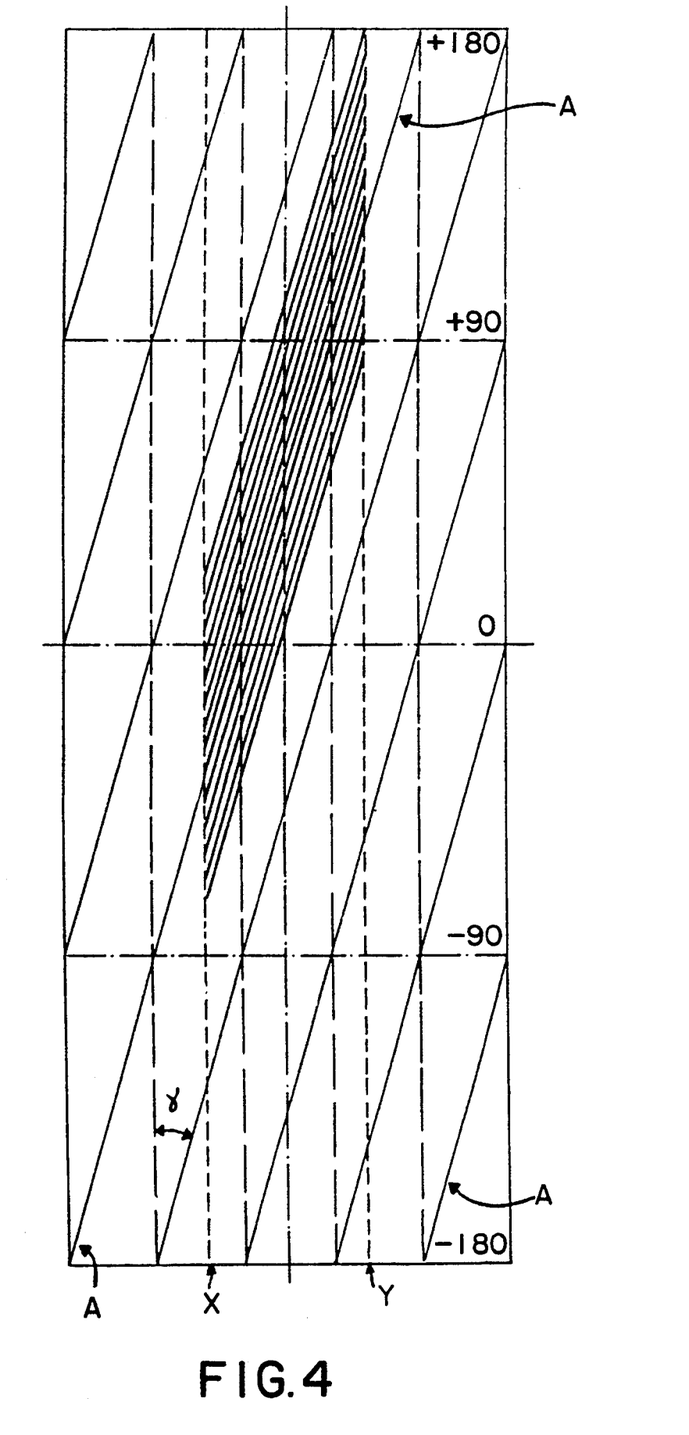
FIGS. 4 and 5 are diagrammatic views for the purpose of explaining the method of laying pieces of cord corresponding to the above variant.

However, the greatest advantage of this variant lies elsewhere. It makes it possible, in fact, more precisely to adjust the angle at which the cord is laid. Let us assume that one reduces the speed of the chain 5 by one fifth. As is evident from the developed diagram of FIG. 4, the trace corresponding to the trajectory of the first laying head is developed over an arc of $360° + 90° = 450°$, since this is equivalent to presenting only four tubes to the cord distributor during one revolution of the core. This trace is indicated by the letter A in FIG. 4. One obtains an angle $\gamma$ such that $\tan \gamma = 4/5 \tan \alpha$.

Figure 5:
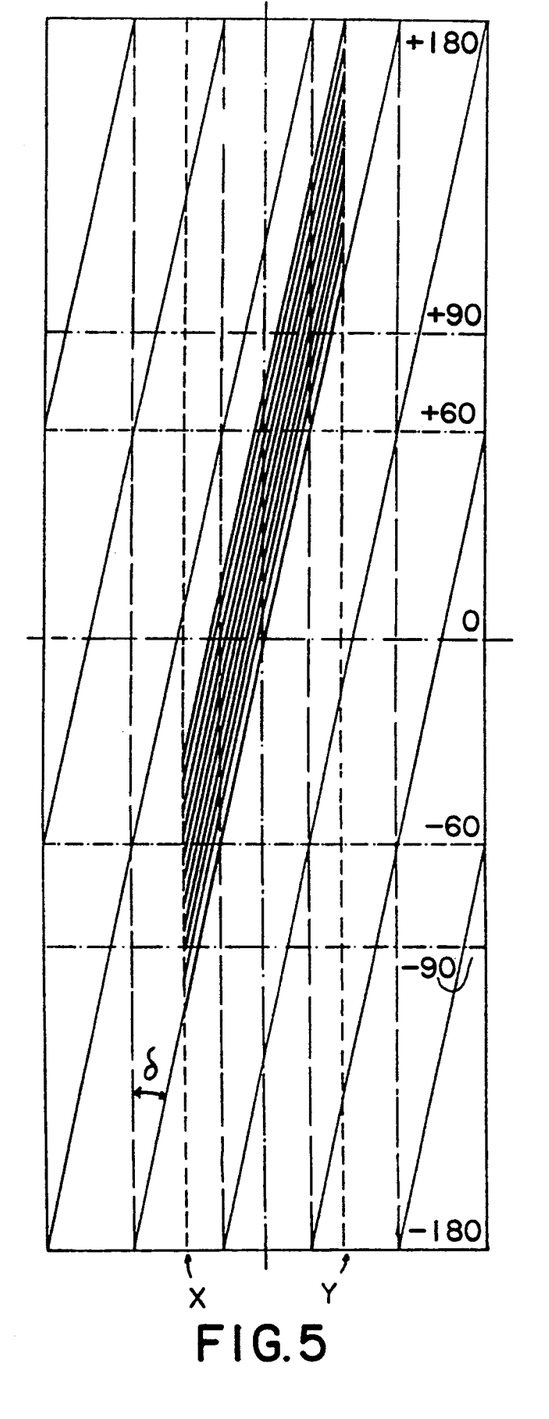

If one further reduces the speed of the chain, for instance by 2/5, then the trajectories obtained are those shown in FIG. 5, in which the laying angle $\delta$ is such that $\tan \delta = 3/5 \tan \alpha$. It is noted that the precision of adjustment is far greater.

Therefore, we see that it is possible to produce a manufacturing machine which makes it possible strictly to respect a constant angle for the laying of the crown reinforcement cords and which makes it possible to adjust this angle by increments which are sufficiently small to correspond to the architectures desired by the tire designers. It is important to note that all of these adjustments are obtained by acting solely on a ratio of two speeds and that the speeds in themselves can be constant. For this, a large number of laying tubes will be used, arranged at equal distances apart on the chain 5. Among these tubes, any number (but a whole number) of them are presented to the core distributor per revolution of the of support. Of course, one then can lay only pieces of cord since the cord must be cut upstream of the laying tubes.

Another manner of regulating the laying angle $\alpha$ consists in modifying the length of the chain itself. Referring again to FIG. 2, knowing that L is the length of the chain 5, it is clearly seen that if L increases while D remains unchanged, the value of the angle $\alpha$ is going to increase. By changing the number of links of the chain and adapting the drive speed so as to have one revolution of the core 1 per revolution of the chain 5, one can obtain practically any laying angle.

It has just been explained that the machine of the invention makes it possible to lay a piece of crown reinforcement cord along a strictly constant angle. Now, the tire designer may, in certain cases, desire that this angle be variable, for instance that this angle increase upon approaching the edge of the crown reinforcement. The means of doing this is to regulate the speed of the chain 5 so as to permit a variable speed thereof while maintaining a constant speed of rotation of the support 1.

Figure 6:
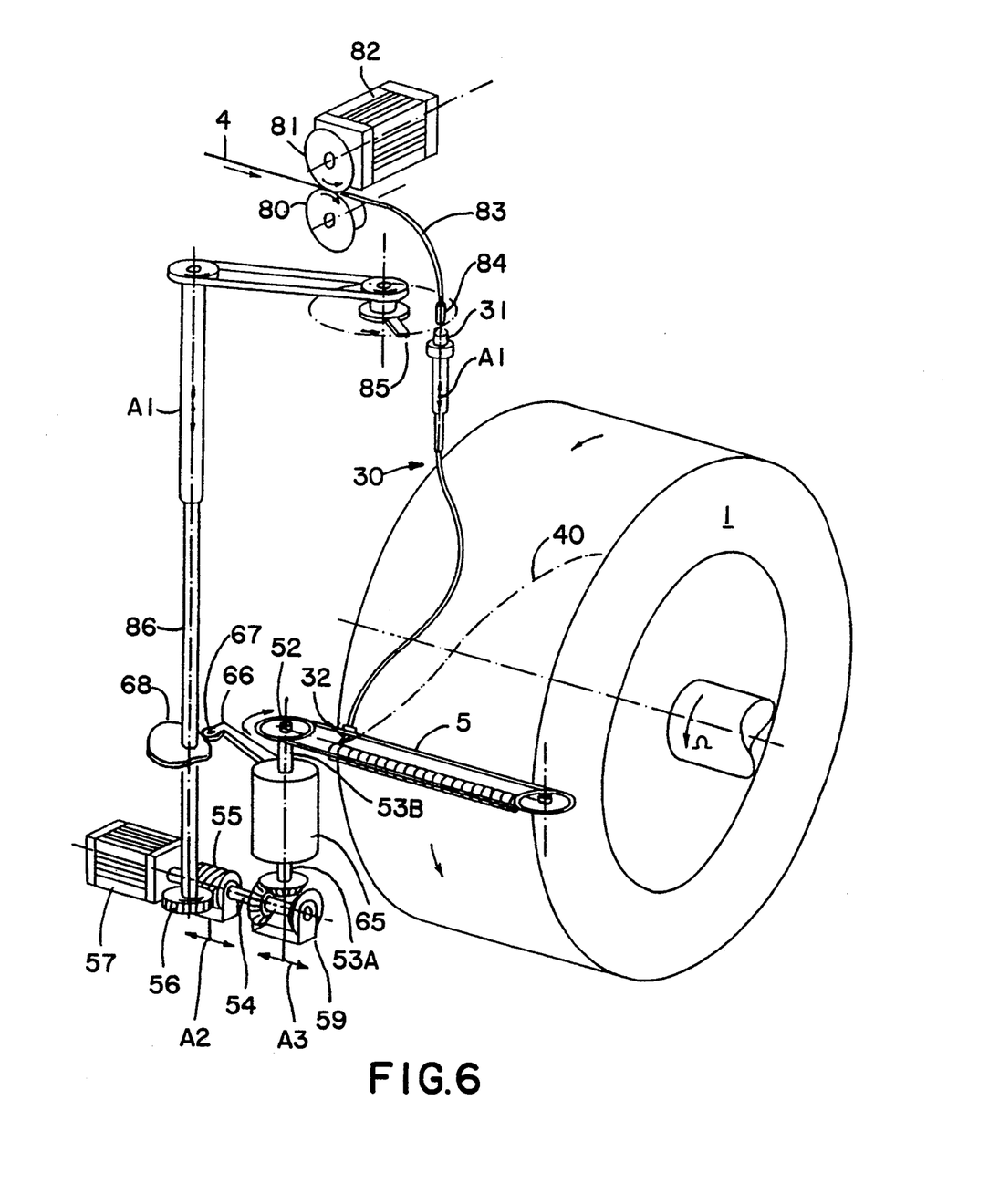
FIG. 6 illustrates another variant of the first machine.

In FIG. 6 there has been shown the modification which is to be made on the machine of FIG. 1 in order to be able to effect this variable angle laying. It is considered that one starts from an average speed of the chain 5 which gives an average laying angle $\alpha$ of the reinforcement cord. The principle consists in adding or subtracting a slight amount of speed to or from the movement of the chain 5. The means for adjusting this speed of the chain 5 include the first shaft 54 driven at a speed which is directly proportional to the speed of the core 1. Up to this point there is no change as compared with the base machine as illustrated in FIG. 1.

But this time, instead of directly driving the pulley 52, a first shaft 53A acts on the first planet wheel of a differential 65. A second shaft 53B is driven by a second planet wheel of the differential 65, and this second shaft drives the pulley 52 which, in turn, drives the chain 5. The satellite-bearing ring of the differential 65 is integral with a lever 66 on which there is fastened a roller 67 which cooperates with a rotary cam 68 driven at an angular speed which is directly proportional to that of the first shaft 53A. A differential is used here due to its capacity to add or subtract speed to or from the speed of rotation of an input shaft in order to obtain a variable speed on an output shaft by acting on the third shaft of the differential.

The profile of the cam 68 is designed to impart two decelerations and two accelerations to the chain 5. The cam 68 is keyed on the shaft 86, so that the first acceleration takes place before the laying head 32 arrives opposite the side end of the crown reinforcement. The head 32 is then decelerated. It is then accelerated again when the laying head arrives at the other edge of the crown reinforcement, and finally the chain 5 is slowed down during the return movement in order to close the cycle.

Figure 7:
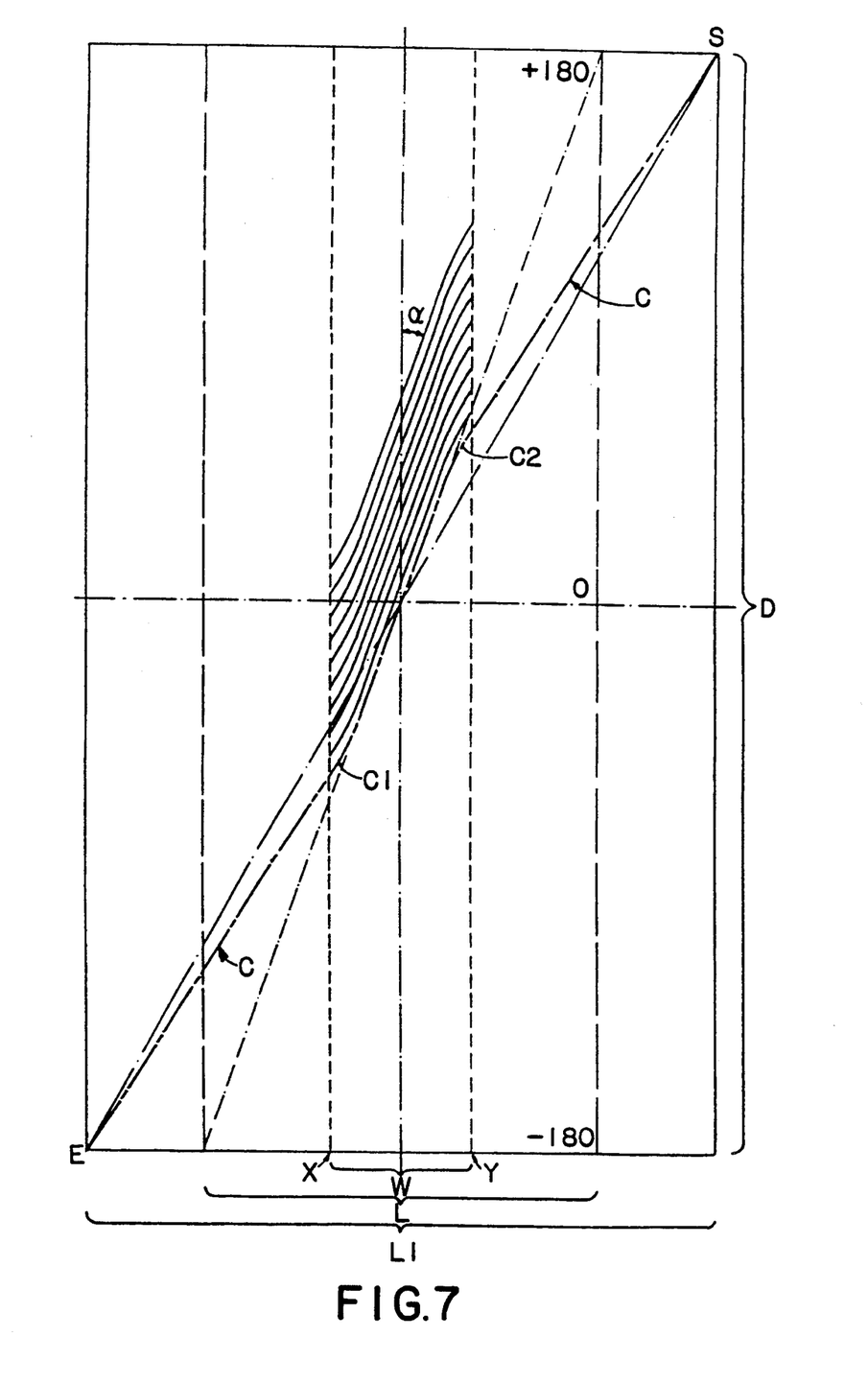
FIG. 7 is a diagrammatic view which illustrates, in particular, the operation of the variant of FIG. 6.

In FIG. 7 the development in a plane corresponding to the variant in FIG. 6 is shown in solid line. At $C_1$ and $C_2$ there can be noted the portions which are deviated with respect to the diagonal, which deviations are due to the cam 68.

This same FIG. 7 shows, in heavy dot-dash lines C, how a cam can be used to adjust the laying angle $\alpha$. It has been explained above that any laying angle can be obtained by changing the length of the chain. It can also be regulated, starting from a given chain length (for instance, $L_1$), by using a cam which gives the desired angle $\alpha$ in the laying region contained between the verticals drawn at X and Y, and which makes it possible to connect the ends E and S of the diagonal which would be obtained with a chain of length $L_1$ without the use of a cam. On an industrial machine, the change of a cam may be an easier operation than the change of a chain. One has here also a possibility for imparting increased utility to the machine.

We furthermore note that, the larger the laying angle, the more the length of the suitable chain increases. However, at the same time, the length of the cord laid decreases for an unchanged width of ply W. It is therefore necessary that the length of the tube 30 decrease, which may make its movements too tight. In order to get over this difficulty, one can always choose to divide the length of the chain by two. One will therefore have two chain passages for one revolution of the core. One can make use of this in order to double the laying rate, provided that one has a suitable cam, if a cam is used.

Figure 8:
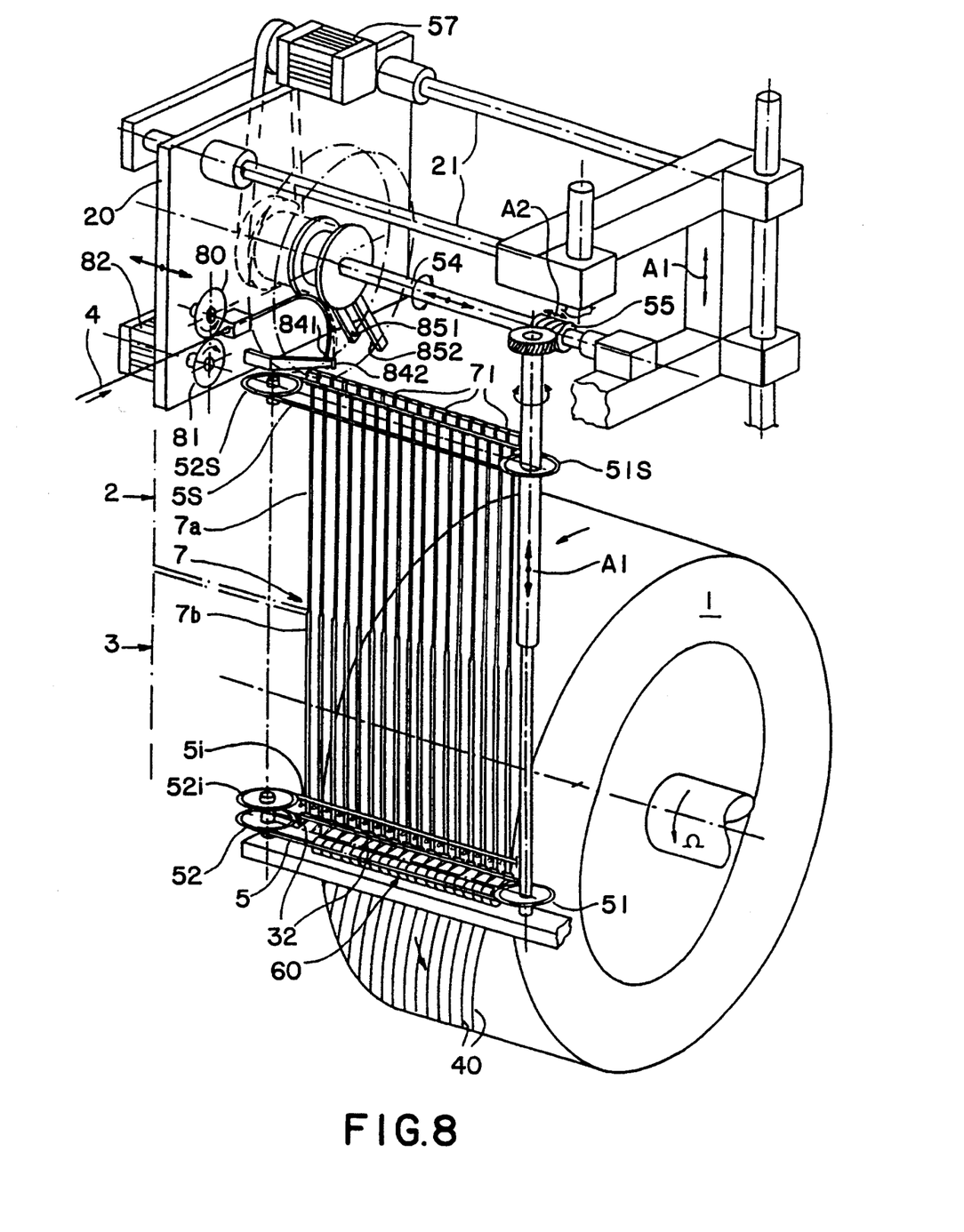
FIG. 8 is a general perspective view showing the essential parts of a second machine.

There has been pointed out above the interest in constructing a machine which has a large number of laying tubes. They are connected to and regularly spaced all along the chain 5, which makes it possible to cause them to move in front of the support 1. FIG. 8 illustrates such a machine. By using, for instance, 50 tubes 7, it is possible to obtain an adjustment of the angle $\alpha$ by increments equal to approximately 20 angular minutes each. The laying tubes connected to the part of the chain 5 furthest from the core have not been shown in order not to clutter FIG. 8 and in order not to mask the laying tubes connected to the part of the chain 5 adjacent to core 1.

In such a machine, the inlet of each of the laying tubes 7 is carried by a secondary drive chain 5S mounted on a secondary guide circuit which is substantially parallel to the guide circuit of the outlets 32 of the laying tubes. The movement of the two drive chains is synchronized. The secondary chain 5S is mounted on the pulleys 51S and 52S.

The pulley 51S is connected to the pulley 51 by a telescopic shaft A1 in order to transmit the drive between the two chains 5 and 5S. All the tubes 7 are made in two sections 7a and 7b which can slide one within the other.

The arrow A1 diagrammatically indicates the adjustment of the length of cord which is to be laid on the support 1. This adjustment A1 is entirely similar to that which was explained in detail above. The drive parts for the cord (rollers 80, 81 and motor 82) and the cord-cutting members (rotary knife 85) are all arranged on the feed assembly 2, which can be translated from top to bottom in accordance with the movements indicated by the arrows A1. This translation makes it possible to adjust the length of cable stored in the laying tubes 7.

The motor 57 must drive both members located on the laying assembly 3 (chain 5) and members located on the feed assembly 2 (rotary knife 85). This time, contrary to the first variant, the motor 57 is arranged on the feed assembly 2. It is mounted on a plate 20 which can be translated horizontally on the slideways 21 parallel to the axis of the core 1. The rollers 80, 81 and their motor 82 are also fastened on this plate 20.

The plate is in left position, as shown in FIG. 8, in the case of right helix pieces. In fact, the cord 4 is to be threaded into the tube 7 located at the left edge of the core 1. The plate is translated towards the right in order to lay cords with left helix. The positioning is effected by a translation which is a phase of adjustment of the machine. When the machine is in operation, the cord is always introduced into a laying tube by the cord distributor when the outlet of the latter (the barrel 841 or 842, respectively) is positioned at a point fixed in space.

There is again present the so-called ply edge adjustment A2; the worm 55 is slidably mounted on the shaft 54.

The assembly of the telescopic laying tubes 7 forms a curtain which continuously moves in front of the core 1. The cord driving system introduces the cord at the inlet 71 of each of the laying tubes 7.

Figure 9:
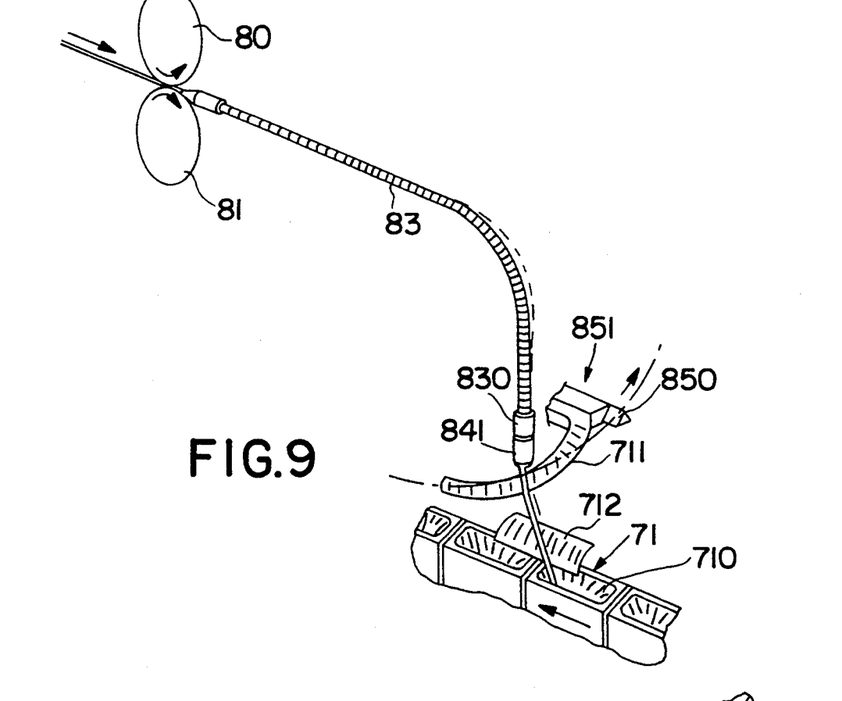
FIG. 9 shows a detail of the feeding of the cord.

In FIG. 9 it is seen that the inlet 71 of each of the laying tubes 7 forms a funnel 710 elongated in the direction of movement of the laying tubes 7. A deviator 711 directs the cord 4 in such a manner that, assisted by the deflector 712, it enters into the funnel 710 which is present in front of the funnel opposite the barrel 841. During the time necessary for the introduction of a piece 40 of cord 4 within a laying tube 7, the inlet 71 of the said laying tube 7 moves laterally by an amount corresponding substantially to the space between two adjacent laying tubes 7.

The funnel shape 710 of the inlet 71 makes it possible to accommodate this transverse displacement. The funnel is symmetrical so that the accommodation acts in both directions (the breaker plies generally have opposite angles). The cutting of the cord takes place when the cord is aligned properly on the shortest path between the barrel 841 and the bottom of the funnel 710 so that, at the outlet, the piece of cord 4 presents itself in ideal manner to be clamped between rollers 60 and core 1.

Furthermore, the rotary knife 851 has, on the rear side of its movement, a clearance 850 which permits as soon as possible the freeing of the outlet of the barrel. In fact, during the cutting of the cord 4, the latter continues to be driven and it is necessary to avoid its accumulating in excessive amount in the flexible tube 83.

The knife 841 is driven in rotation by the shaft 54. Now, the latter also controls the movement of the chains 5 and 5S. It is known that it is necessary to be able to reverse this movement in order to lay at times left helix sections and at other times right helix sections, which is done in this machine by reversing the direction of rotation of the motor 57.

Now, a knife such as the knife 851 cannot be reversible since it has a clearance 850. Therefore the presence of a second knife 852 which is used for the laying of the pieces with left helix. The knife 851 turns in front of the barrel 841, which is rigidly attached to the plate 20. The knife 852 turns in front of the barrel 842, which is also rigidly attached to the plate 20. The knives 851 and 852 are translated at the same time as the barrels 841 and 842. When the plate 20 has positioned the suitable knife at the desired position, the outlet 830 of the flexible tube 83 is placed opposite the corresponding barrel by a mechanism not shown in the drawing.

Figure 10:
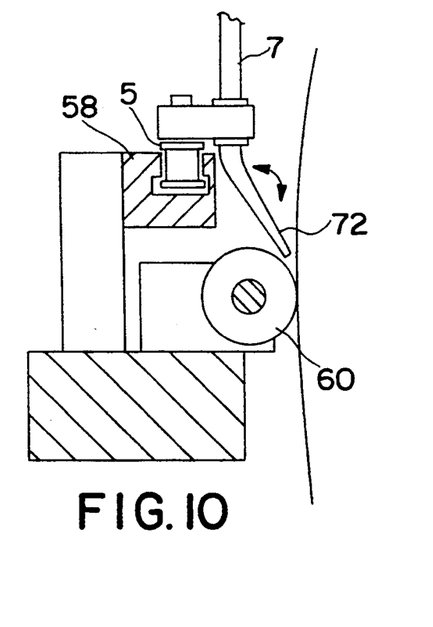
FIG. 10 shows the outlet of the laying tubes.

In FIG. 10 it is seen that the chain 5 is engaged on a chain-guide 58 which fits as closely as possible the shape of the core 1. All the outlets 72 of the laying tubes 7 are attached to the chain 5 On this machine, there is again a ramp of rollers 60, the role of which is to complete the anchoring of each piece 40 on the core 1, as has been explained above.

Each laying head 72 is preferably so oriented that the cord 4 which emerges from it presents itself with respect to the core 1 in accordance with an angle of the same sign as the helix angle desired. It is necessary to be able to reverse this orientation in order to pass from one breaker ply to the next. For this purpose, an inversion chain 5i, mounted on pulleys 52i, is used (FIG. 8).

A control (not shown) makes it possible to modify the angular position of the pulley 52i with respect to the pulley 52. Each tube 7 is connected to the inversion chain 5i by small connecting links which impose a movement of rotation on each tube 7 in the proper direction.

Figure 11:
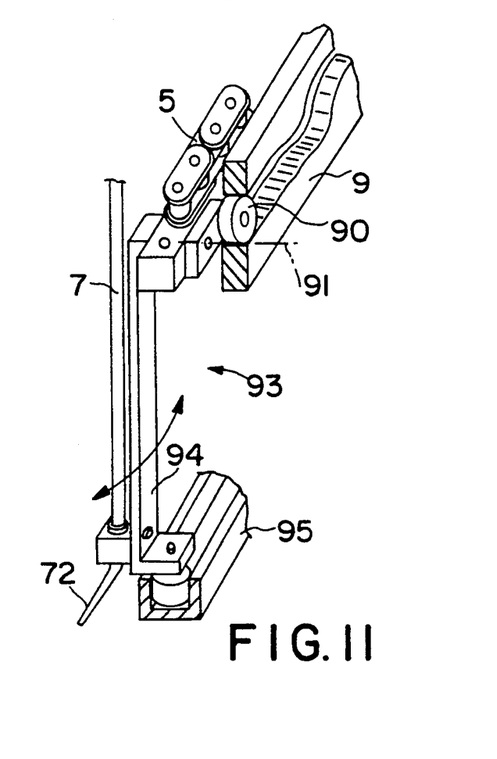
FIG. 11 illustrates a variant of the second machine.

FIG. 11 illustrates how it is possible slightly to vary the speed of each of the laying heads 72. The purpose of this variation is the same as that which has been explained above, namely to lay all the pieces 40 along a variable angle. It is therefore advisable to slow down and then accelerate each of the laying heads 72 individually.

Each laying head 72 is connected to the drive chain via a rocker 93 comprising a pivot pin 91 and two levers. A roller 90 is mounted at the end of one of these levers. The laying head 72 is mounted at the end of the other lever. The roller 90 is engaged on a cam 9 which is oriented parallel to the guide circuit of the chain 5. The profile of the cam makes it possible, for a constant speed of the drive chain 5, to vary the transverse speed of each laying head 72 individually. The tube 7 must, of course, have sufficient flexibility.

It will be understood that the role of the chain 5 is to guide and drive the pivot pin 91 of the rockers 93. The laying head 72 of each laying tube 7 is connected to the end 94 of the rockers 93. This end 94 is guided laterally by the rails 95.

In the light of this description, the person skilled in the art can easily produce variants and use adaptations without going beyond the scope of the present invention. One may, for instance, desire to lay cords of textile material. As none of the cords present resistance to compression they must necessarily be maintained under tension. Wherever this is necessary, one can use a pneumatic propulsion of the type indicated by reference numeral 56 in U.S. Pat. No. 3,894,906. Such a propulsion would be used in tubes 30 or 7, as well as in the flexible tube 83.

We claim:

1. A machine for the manufacture of a crown reinforcement for tires, comprising a cord distributor, members for laying a cord at the desired place on a support and means for driving the support in rotation around its axis of symmetry of revolution, characterized by the fact that the outlet of the cord distributor delivers the cord to the laying members at a point fixed in space, located radially above the support, and by the fact that the laying members comprise
   at least one laying tube arranged downstream of the cord distributor, the cord delivered being threaded into the inlet of the laying tube while the inlet is substantially opposite said outlet of the cord distributor and at a slight distance from it, the cord moving within the laying tube to the outlet thereof laying head connected to the outlet of the laying tube to lay the cord on the support and means for transversely displacing the laying head across the support and further comprising cord cutting means intermediate the outlet of the distributor and the inlet of the laying tube.

2. A machine according to claim 1, characterized by the fact that the cord distributor comprises a drive assembly for the cord which advances the cord at a selected linear speed, delivering the cord to the means for cutting the cord in order to obtain pieces thereof.

3. A machine according to claim 1, characterized by the fact that the laying head is displaced across the support along a trajectory substantially contained within a meridian plane, and by the fact that the laying angle of the pieces of cord on the support is regulated by coordinating the speed of the means for displacing the laying head and the speed of the driving in rotation of the support.

4. A machine according to claim 1, characterized by the fact that it comprises a plurality of laying tubes each connected to a different laying head and each tube having an inlet through which the cord is threaded, and by the fact that it comprises a device for presenting each of these inlets, in succession, to the cutting means for introduction of the cord, the movement of the presentation device being synchronized with the movement of the laying head.

5. A machine according to claim 1, characterized by the fact that the means for displacing the laying head transversely include a flexible drive strand mounted on a guide circuit, a part of which is arranged transversely with respect to the support over the entire width thereof, the laying head being carried by the drive strand, and by the fact that the machine comprises means imparting movement to the drive strand.

6. A machine according to claim 5, characterized by the fact that the presentation device is a turret barrel.

7. A machine according to claim 5, including a plurality of laying tubes each connected to a different laying head and a presentation device for presenting the inlets of different tubes to the cutting means, the presentation device including a secondary drive strand mounted on a secondary drive circuit, substantially parallel to the guide circuit of the laying heads, the movement of the two drive strands being synchronized.

8. A machine according to claim 1, characterized by the fact that it comprises a pressing device covering the width of the support.

9. A machine according to claim 8, characterized by the fact that it comprises a pressing device a installed parallel to the part of the guide circuit arranged transversely with respect to the support and at the point of encounter of the cord on the support.

10. A machine according to claims 1, characterized by the fact that the means for displacing the laying head permit a variable speed for a constant speed of rotation of the support, so as to lay the cord on the support along a variable angle.

11. A machine according to claim 5, characterized by the fact that the means imparting movement to the drive strand are formed by a first shaft driven at a speed directly proportional to the speed of rotation of the support, the first shaft acting on the input shaft of a differential, a second shaft driven by the output shaft of the differential, the second shaft driving the flexible strand, a third shaft of the differential being integral with a lever on which there is fastened a roller cooperating with a rotary cam driven at an angular speed which is directly proportional to the speed of the first shaft.

12. A machine according to claim 9, characterized by the fact that the laying head is connected to the drive strand by a rocker comprising a pivot pin and two levers integral with each other, swinging around the pivot pin, and by the fact that the pivot pin is carried by the drive strand, by the fact that the or each laying head is mounted at the end of one of the levers, and by the fact that a roller is mounted at the end or the other lever and is engaged on a cam which is oriented parallel to the guide circuit, the profile of said cam making it possible, for a constant speed of the drive strand, to vary the transverse speed of the laying head or heads with respect to the speed of the strand.

13. A machine according to claim 5, characterized by the fact that the guide circuit is defined by two pulleys disposed on opposite sides of the support, on which pulleys the drive strand is mounted, the axis of rotation of the pulleys being perpendicular to a radius of the support passing through the strand and perpendicular to the axis of rotation of the support.

14. A machine for the manufacture of a crown reinforcement for tires comprising a support which is rotatable on an axis, the outer surface of the support receiving different components of the tire in the order and place required by the architecture of said tire and on which a crown reinforcement is formed by laying individual pieces of cord diagonally and transversely across the support, the pieces of cord being adhesively maintained on the support, a laying head carried transversely across the support, a tube having an inlet end for receiving the cord and an outlet end for directing the cord to the laying head, means for adjusting the length of the tube to adapt it to the length of the cord to be laid, means for feeding the cord from a source to a fixed point in space and for introducing the cord into the inlet of the tube at that fixed point and cutting means located intermediate the feeding means and the tube inlet at such fixed point for cutting a length of cord.

* * * * *

UNITED STATES PATENT AND TRADEMARK OFFICE
CERTIFICATE OF CORRECTION

PATENT NO. : 5,395,476
DATED : Mar. 7, 1995
INVENTOR(S) : Debroche et al.

It is certified that error appears in the above-indentified patent and that said Letters Patent is hereby corrected as shown below:

Col. 8, line 20, "$\alpha 0$" should read --$\alpha$--.

Col. 12, line 4, "5 On" should read --5. On--.

Col. 13, line 3, "laying" should read --a laying--;

line 6, "and further ..." should start a new line at the left-hand margin;

line 41, "claim 5" should read --claim 4--;

line 55, "claim 8" should read --claim 5--;

line 56, "device a" should read --device--.

Col. 14, line 19, "claim 9" should read --claim 5--.

Signed and Sealed this

Fourth Day of July, 1995

BRUCE LEHMAN

*Attest:*

*Attesting Officer*  *Commissioner of Patents and Trademarks*